United States Patent
Stech (10) Patent No.: US 8,327,895 B2
(45) Date of Patent: Dec. 11, 2012

(54) DRIVE AXLE SEAL BODY AND TIRE INFLATION SYSTEM

(75) Inventor: Clyde G. Stech, Mooresville, NC (US)

(73) Assignee: Fleet Technologies LLC, Cleveland, OH (US)

(*) Notice: Subject to any disclaimer, the term of this patent is extended or adjusted under 35 U.S.C. 154(b) by 265 days.

(21) Appl. No.: 12/657,629

(22) Filed: Jan. 25, 2010

(65) Prior Publication Data

US 2011/0180192 A1 Jul. 28, 2011

(51) Int. Cl.
*B60C 23/10* (2006.01)
(52) U.S. Cl. ............... 152/417; 152/415; 301/124.1; 277/370
(58) Field of Classification Search .......... 152/415, 152/416, 417; 301/124.1, 125; 277/370
See application file for complete search history.

(56) References Cited

U.S. PATENT DOCUMENTS

| | | | |
|---|---|---|---|
| 1,794,900 A | 3/1931 | Hutchinson | |
| 2,588,670 A * | 3/1952 | Terry | 475/246 |
| 3,535,002 A * | 10/1970 | Stamm | 301/124.1 |
| 4,470,506 A * | 9/1984 | Goodell et al. | 206/223 |
| 4,576,384 A * | 3/1986 | Azibert | 277/370 |
| 4,844,138 A | 7/1989 | Kokubu | |
| 5,192,085 A * | 3/1993 | McOnie | 277/370 |
| 5,199,720 A * | 4/1993 | Radosav et al. | 277/370 |
| 5,377,736 A | 1/1995 | Stech | |
| 5,961,122 A * | 10/1999 | Marsi | 277/306 |
| 5,964,469 A * | 10/1999 | Grossman et al. | 280/11.221 |
| 6,068,264 A * | 5/2000 | Azibert et al. | 277/370 |
| 6,145,559 A * | 11/2000 | Ingram, II | 152/417 |
| 6,425,427 B1 * | 7/2002 | Stech | 152/417 |
| 6,550,779 B2 * | 4/2003 | Bjornson | 277/370 |
| 7,967,045 B2 * | 6/2011 | Jenkinson et al. | 152/416 |
| 7,975,739 B1 * | 7/2011 | Ingram | 152/417 |
| 8,028,732 B1 * | 10/2011 | Ingram et al. | 152/417 |
| 8,047,246 B2 * | 11/2011 | Isono | 152/417 |
| 8,057,103 B2 * | 11/2011 | Fischer et al. | 384/477 |
| 8,091,897 B2 * | 1/2012 | Giard | 277/370 |
| 2009/0084481 A1 * | 4/2009 | Kalavitz | 152/417 |

* cited by examiner

*Primary Examiner* — Kip T Kotter
(74) *Attorney, Agent, or Firm* — Larkin Hoffman Daly & Lindgren; Robert C. Klinger (57) ABSTRACT

A sealing body disposed about a rotating drive axle and forming an air chamber thereabout. The drive axle is provided with an air conduit extending therein and communicating air from the air chamber to the center of the drive axle and for delivery to tires via the wheel at the center of the axle flange. The sealing body includes an air conduit in communication with the air chamber, and is configured to secure to remain stationary about the drive axle axially rotating therein. The sealing body is typically disposed between the drive axle splines and the wheel and forms an air seal thereabout. The sealing body may comprise of a plurality of parts when the splines have a greater diameter than the remainder of the drive axle, but may also comprise of a unitary body configured to be axially disposed over the splines when the splines have a diameter consistent with the drive axle.

21 Claims, 8 Drawing Sheets

DRIVE AXLE SEAL BODY AND TIRE INFLATION SYSTEM

FIELD OF THE INVENTION

The present invention is generally related to vehicle tire inflation systems, and particularly to medium and heavy duty trucks having a drive axle.

BACKGROUND OF THE INVENTION

Vehicle tire inflation systems are typically installed in trucks and truck trailers to deliver pressurized air to tires and maintain air pressure at a safe level during operation. Typically, these tire inflation systems are employed on truck trailers which do not have the drive axles. This is because pressurized air can be easily routed either within or along the non-rotating trailer axle and delivered to the rotating tires, such as via a rotary union. Examples of some trailer axle tire inflation systems invented by the applicant of the present invention can be seen in U.S. Pat. Nos. 5,287,906, 5,377,736, and 6,425,427, the teachings of which are incorporated herein by reference.

The industry has accepted inflation technology for trailers, which technology uses the axle beam as a conduit for air delivery, whether the axle itself is pressurized and conducts air, or a separate, internal air line extending therealong is used. This method of air delivery is optimal as it keeps external plumbing in critical areas to a minimum, and it delivers air to the center of the wheel hub base or hubcap for delivery to the respective tires.

Currently, there is no known drive axle technology that utilizes the drive axle shaft itself as an air conduit, primarily because the drive axle is a solid shaft and it rotates within a differential housing with very little clearance between the shaft and housing wall. One solution is known that provides an air line between the rotating axle shaft and the housing wall and which terminates off center and outside the wheel hub face. This approach is not only impractical and short-lived due to complications inherent in running an air line through that passage, but it also ends up supplying air at an off-center (non-optimum) point outside the axle and substantially removed from the very center of the wheel hub face or hubcap.

Further complicating the drive axle system is the fact that drive axles typically employ splines disposed about the drive axle, and which splines typically have an outer diameter (OD) that is greater than the drive axle. These drive axle splines and relative dimensioning complicate the delivery of pressurized air to a wheel end and tires via the drive axle. There is desired a drive axle tire inflation system configured for use in medium and heavy duty vehicles, with minimum plumbing, whereby an air source can be delivered to tires in a reliable and cost effective manner.

SUMMARY OF INVENTION

The present invention achieves technical advantages by providing a sealing body disposed about a rotating drive axle and forming an air seal thereabout. The drive axle is provided with an air conduit extending therein and communicating air from the sealing body to the center of the drive axle and for delivery to tires via the center of an axle flange. The sealing body includes an air conduit in communication with an air chamber defined about the drive axle, and is configured to secure to the differential housing and remain stationary about the drive axle axially rotating therein. The sealing body is typically disposed between the drive axle splines and the axle flange. The sealing body may comprise of a plurality of parts, such as when the splines have a greater diameter than the remainder of the drive axle, but may also comprise of a unitary body configured to be installed by disposing over the splines when the splines have a diameter consistent with the drive axle.

DETAILED DESCRIPTION OF THE PRESENT INVENTION

Figure 1:
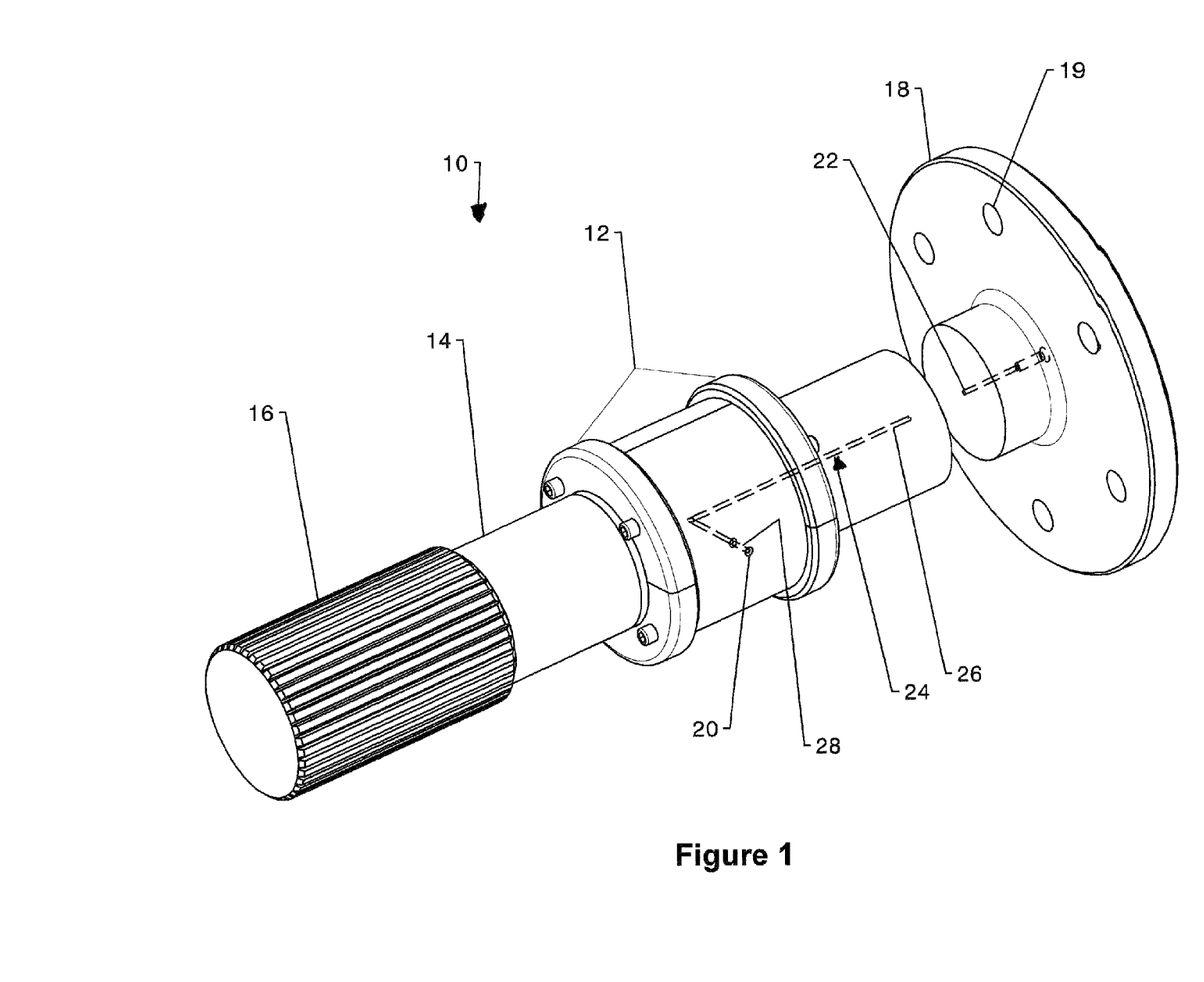
FIG. 1 is a perspective view of a drive axle sealing body according to one embodiment of the present invention.
Figure 2:
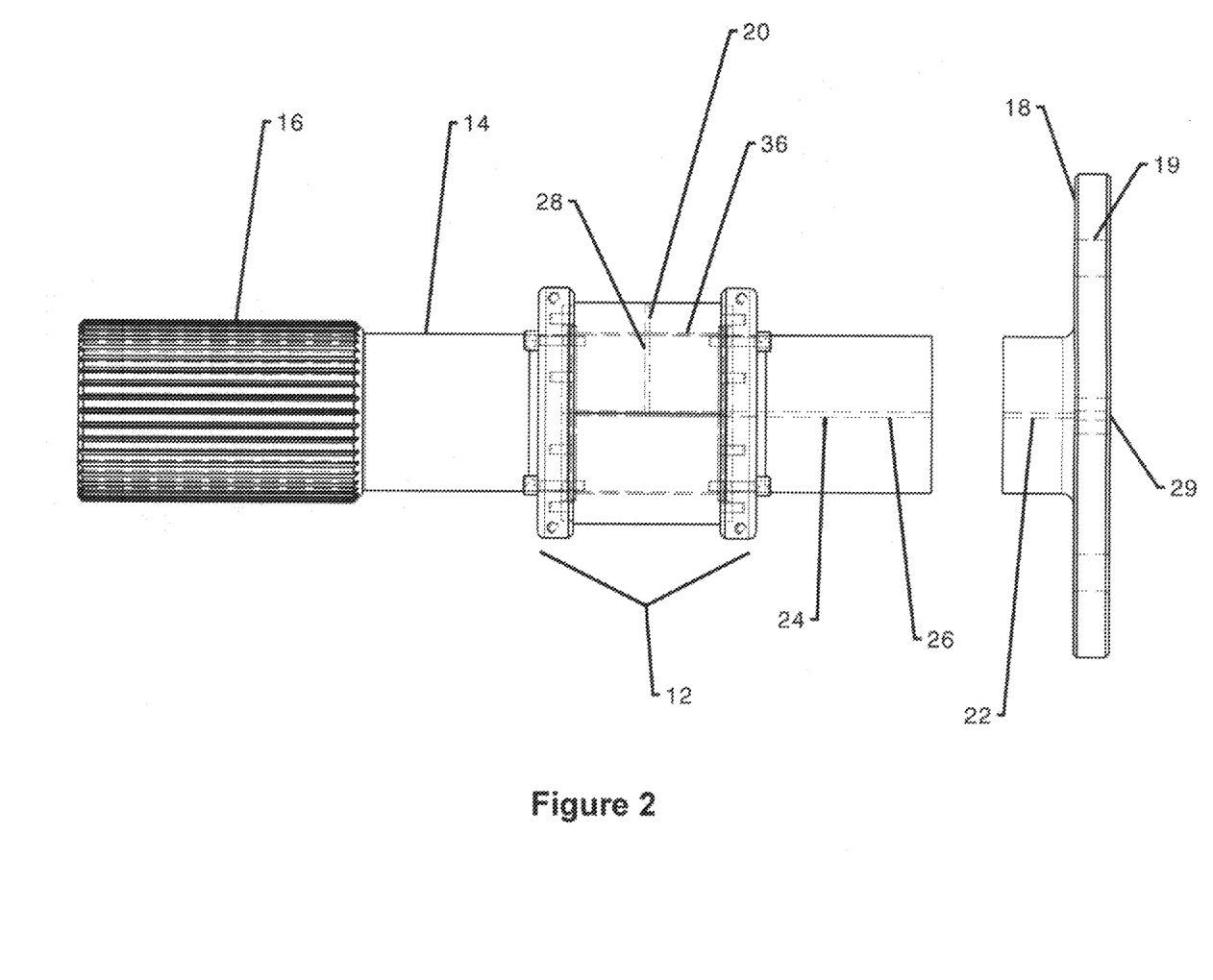
FIG. 2 is a side elevational view of the sealing body of FIG. 1 depicting an air conduit extending thru the solid drive axle and communicating air from the sealing body to the center & out the axle flange.

Referring now to FIG. 1 there is generally shown at 10 a drive axle tire inflation system including a sealing body 12 disposed about a vehicle drive axle 14 axially extending therethrough. Drive axle 14 is seen to include a driving portion comprising of radially extending splines 16 at the proximal end of drive axle 14. An axle flange 18 having stud holes 19 is secured to the distal end of drive axle 14 and is configured to secure to tires (not shown). Sealing body 12 is further comprised of an air passageway 20 extending thru a central portion of the sealing body 12, configured to communicate air pressure from the air passageway 20 to an air passageway 22 axially extending thru a central portion of the axle flange 18 via a drive axle air passageway 24 as shown in FIG. 2 extending thru the solid drive axle 14. The sealing body 12 is configured to be secured to the vehicle body (not shown) and remain stationary while drive axle 14 is rotated therewithin. The drive axle air passageway 24 has an axially extending portion 26 configured to align with and deliver air pressure to the center of flange end air passageway 22, and also has a radially extending portion 28 extending to the outer surface of the drive axle 14 at location within the sealing body 12. Sealing body 12 defines a sealed air chamber 36 as shown in FIG. 2 about the drive axle 14 such that pressurized air delivered from air source passageway 20 is communicated to the drive axle air passageway 24 even when the radially extending portion 28 is not aligned with air source passageway 20.

FIG. 2 depicts a side elevational view of the system 10 shown in FIG. 1 including the axially extending portion 26 of the drive axle air passageway 24 and the radially extending portion 28. As shown, the drive axle air passageway portion 26 is axially aligned with the axle flange air passageway 22 at the center of the axle flange 18. Also shown is the air chamber 36 defined between the drive axle 14 and chamber bodies 30 and 32 sealed thereabout as the drive axle 14 is rotated. Air provided to air passageway 22 is communicated via opening 29 to the tires, such as via quick connects (not shown).

Figure 3:
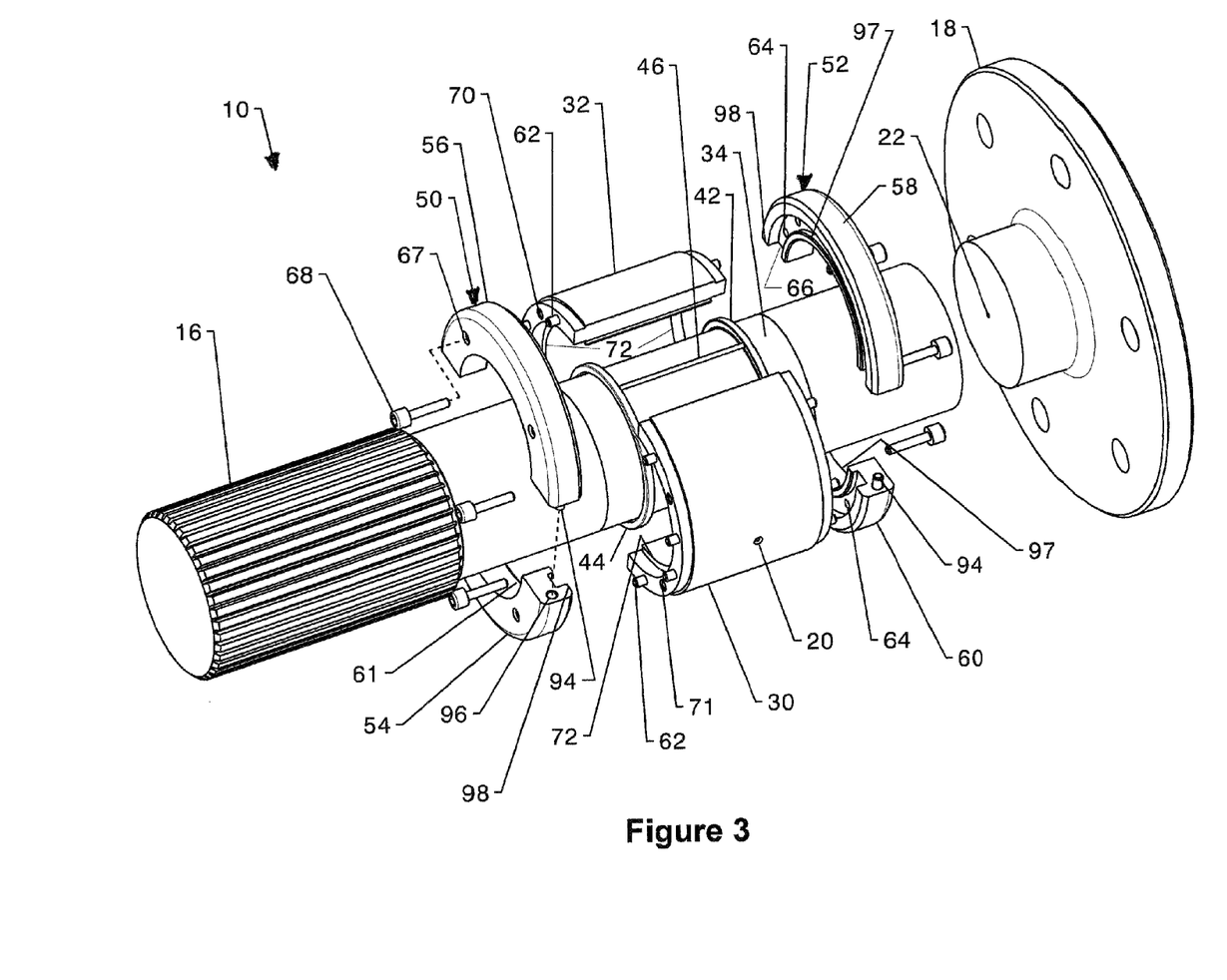
FIG. 3 is an exploded view of the sealing body depicted in FIG. 1.

Referring now to FIG. 3 there is shown an exploded view of the sealing body 12 seen to comprise the first arcuate chamber body 30 and the second arcuate chamber body 32 juxtaposed with the first sealing body 30 and together forming a continuous chamber body about a mid portion 34 of the drive axle 14. Disposed about the mid portion 34 of drive axle 14 is seen a horizontal/radial shaft seal 40 comprising a first annular ring seal 42 and a second annular ring seal 44 joined by a pair of laterally extending longitudinal seals 46 extending parallel to the drive axle 14. The annular ring seals 42 and 44 are secured between the respective seal body flanges 72 and end cap inner flanges 97. The horizontal/radial shaft seals 46 are secured about the mid portion 34 defined between the axle flange 12 and the splines 16 between seal body flanges 74.

Further shown in FIG. 3 is a pair of end caps, comprising alignment end caps 50 and 52 each secured to and positioned at respective ends of the seal bodies 30 and 32, as shown. The first alignment end cap 50 is seen to comprise of a first arcuate flange member 54 and a second arcuate flange member 56 juxtaposed to each other and sealingly disposed about drive axle 14 extending therethrough. The second end cap 52 is seen to comprise of a first arcuate flange member 58 and a second arcuate flange member 60 juxtaposed therewith, sealingly disposed about the drive axle 14, similar to end cap 50. Each of the flange members has an inner arcuate surface 61 having a radius of curvature similar to the outer diameter of drive axle portion 34 to maintain a seal between surface 61 and the drive axle 14. The sealed cavity 36 is defined by the seal bodies 30 and 32, the end caps 50 and 52 comprising alignment flanges 54 and 56, 58 and 60, respectfully, and the horizontal/radial shaft seal 40 comprising seals 42, 44 and 46. This sealed housing makes up the air cavity/ fluid chamber 36 which allows air to flow into passageway 24 to passageway 22 of the axle flange 18. The end caps 50 and 52 precisionally align the seal bodies 30 and 32 to create the sealed cavity 36 about the rotatable drive axle 14 and provide a reliable sealed cavity 36 over extended operation of the seal body 12. The end caps 50 and 52 and seal bodies 30 and 32 secure the seals 42, 44 and 46 to maintain a seal when secured thereabout and the sealed cavity 36 is pressurized.

The drive axle portion 34 is typically machined and plated, such as chrome plated, and the arcuate surfaces 61 are typically comprised of a bronze alloy or other bearing alloy, to prevent wear over time, minimize friction and minimize generated heat by rotation of the drive axle 14 thereagainst.

As shown in FIG. 3, the seal body members 30 and 32 have a plurality of dowel pins 62 configured to precisionally align with and be received in respective openings 64 defined in a flange surface 66 of the flange members, as shown. The flange members 54, 56, 58 and 60 are also provided with openings 67 laterally extending therethru and configured to receive a fastener 68 extending therethru and securing to a respective threaded/tapped opening 70 formed in the end surface of the respective seal body 30 and 32. The interfacing surfaces of the seal bodies 30 and 32 are positioned along a mid-section of the respective alignment flanges 54, 56, 58 and 60 to provide a mechanically rigid structure.

When assembled, the sealing body 12 is aligned about the sealing ring 40 and is secured in the axial and longitudinal direction with respect to the drive axle 14. As shown in FIG. 3, the sealing chambers 30 and 32 have arcuate flange surfaces 71 configured to align with and engage the respective alignment flange surfaces 66, abutting the opposing surface thereof. The horizontal/radial seal 46 seals the seal bodies 30 & 32 horizontally, and radial seals 42 & 44 seal the seal bodies with the end caps 50 (54 & 56) and 52 (58 & 60). The inner flange 97 of each flange member 52, 54, 58 and 60 is configured to secure against the opposing outer side surface of the respective alignment ring 42 and 44. Seal 42 and 44 sealingly reside in a respective groove defined by flanges 72 of the seal bodies 30 and 32 and against the drive axle 14. Seal 46 sealingly resides in a groove defined by the interfacing flanges 74 of seal bodies 30 and 32 and against the drive axle 14

During assembly, the radial seal rings 42, 44, & horizontal seal 46, and all inside surfaces of the sealing body 12 are pre-lubricated. The sealing body 12 stays lubricated about the rotating drive axle 14 by a ring gear rotating in the lubricant inside the differential housing, as lubrication vapors will penetrate from outside of seal body as here is a minute gap of about 0.002-0.003 inches thick between outside of flange members 52, 60, etc and the axle 14 that the vapors will seep into.

Figure 4:
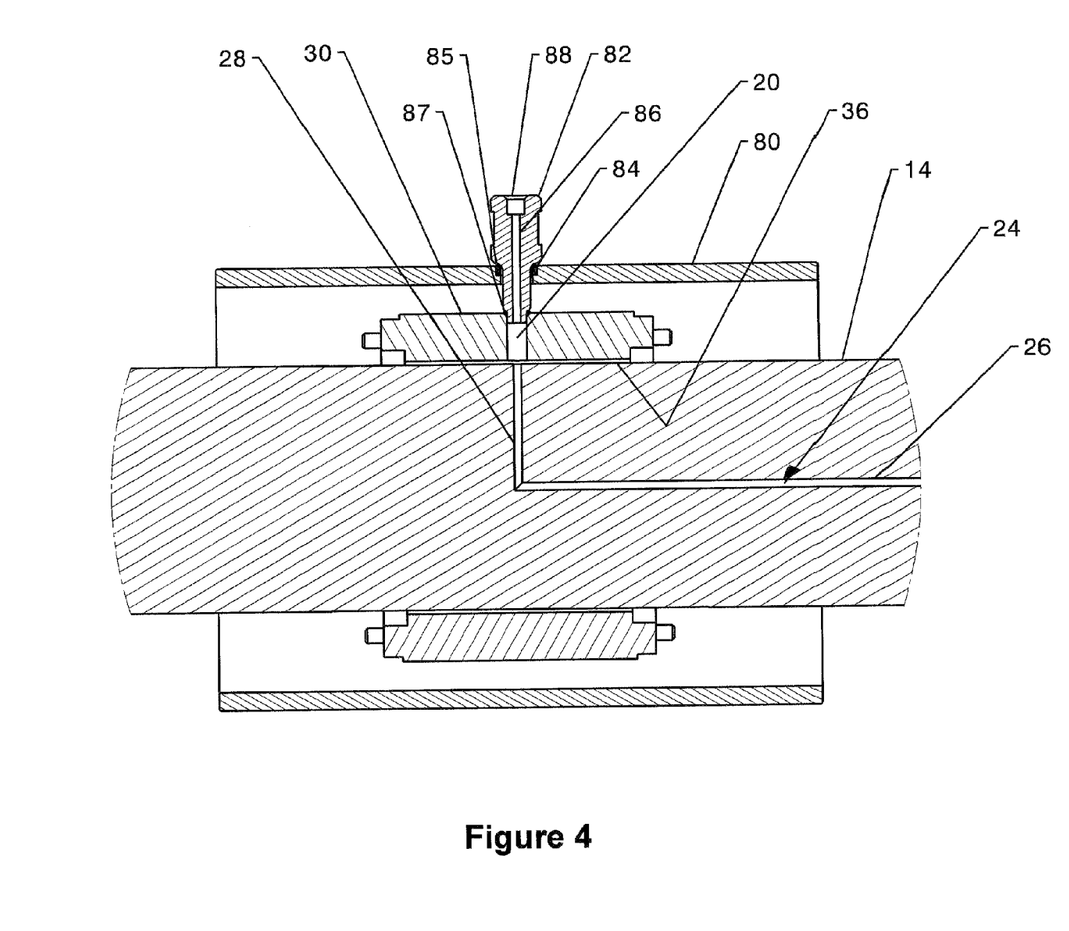
FIG. 4 is a side sectional view of the sealing body taken along the sealing body air conduit of FIG. 1 shown communicating with the drive axle air conduit.

Referring now to FIG. 4, there is shown a cross section of the sealing body 12 disposed about the drive axle 14, whereby the sealing body 12 and the drive axle 14 are positioned in a differential housing 80. A threaded tubular shaft 82 is seen to be disposed thru an opening 84 formed thru the wall of the differential housing 80 and which is aligned with and inserted into the air source opening 20 of sealing body 12, as shown. The shaft 82 prevents the sealing body 12 from moving along the axle 14.

Threaded tubular shaft 82 has an axially extending air passageway 86 in fluid communication with the air source opening 20, and 88 is a tapped hole to receive a connector that connects to a pneumatic source (not shown). A radial seal 85 is disposed about opening 84, and an inner o-ring seal 87 is sealingly disposed between pilot shaft 82 and opening 20. Advantageously, the present invention does not require any plumbing between the rotating axle shaft 14 and the interior wall of the differential housing 80. Further, the present invention does not require any expensive exposed parts or expensive reworks to critical spindles, hubs, bearing housing, etc. The present invention does not require any exposed plumbing around any brakes or wheel ends, or in other critical areas. Rather, the present invention provides an air source to the drive axle in protected areas, and to the wheel hub and tires in protected areas, in areas that have already been proven to work on common trailer systems.

Advantageously, the drive axle 14 only requires a minimal rework to the axle shaft itself. Preferably, the drive axle 14 is machined at portion 34 and is preferably plated to reduce friction and provide an air seal when the flange members of the sealing body 12 are sealingly disposed thereabout. The drive axle passageway 24 is easily created by boring the axle portion 26 centered horizontally in the axle 14, such as 18 inches, and the air passageway portion 28 centered vertically, which may be less than 12 inches.

The sealing body 12 achieves technical advantages because it can be assembled about the drive shaft 14 even when the splines 16 have an outer diameter greater than the drive axle portion 34 disposed between the splines 16 and the distal end thereof. It is noted that the sealing body 12 may also be configured of a unitary body and axially disposed over the drive axle portion 34 if the splines 16 are configured to have the same diameter as the drive axle portion 34.

Figure 5:
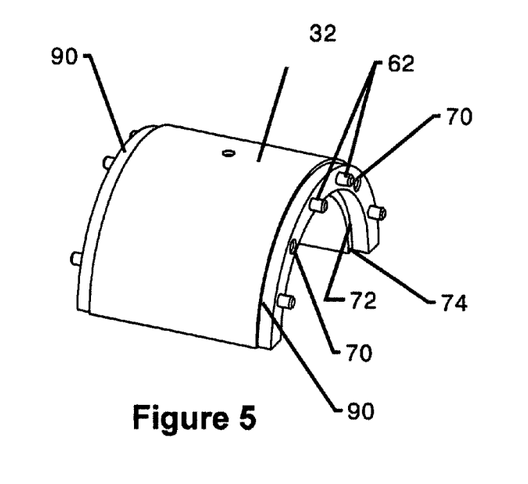
FIG. 5 is a perspective view of one seal body forming the exterior portion of the sealing body shown in FIG. 3.

Referring now to FIG. 5 there is shown a perspective view of seal body 32, depicting the dowel pins 62 and the tapped openings 70, as well as inner flanged portions 72 and outer flange portion 90. Seal bodies 30 and 32 are similar, where seal body 30 further includes air source passageway 20 defined therethru.

Figure 6:
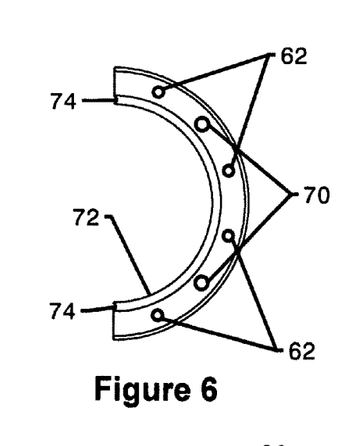
FIG. 6 is an end view of the seal body shown in FIG. 5.

FIG. 6 depicts an end view of the seal body 32 depicting the arcuate flange 72 for securing seals 42 and 44, and the lateral flange 74 for securing seal horizontal/radial seal 46, the dowel pins 62, and the tapped openings 70.

Figure 7:
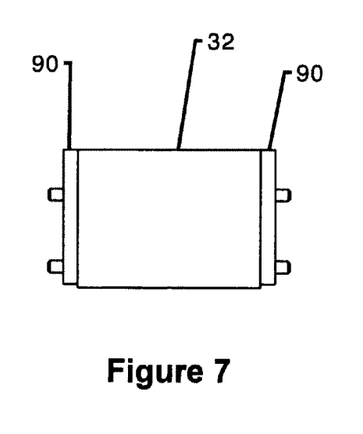
FIG. 7 is a side view of the seal body shown in FIG. 5.

FIG. 7 depicts a side view of the seal body 32, and outer flanged portions 90 configured to align with and abut the respective alignment flange when inserted therein.

Figure 8:
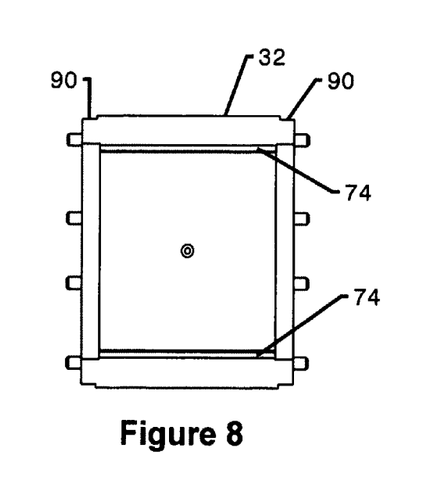
FIG. 8 is a inside view of the seal body shown in FIG. 5.

Referring now to FIG. 8, there is shown an inside end view of chamber body 32.

Figure 9:
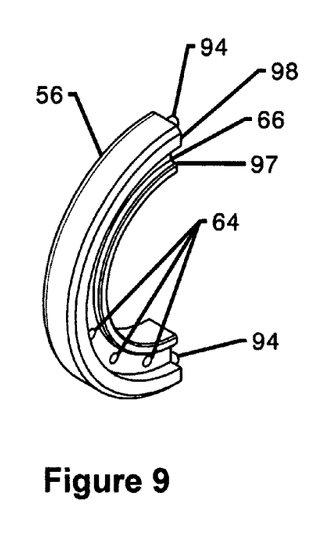
FIG. 9 is a perspective view of one alignment flange depicted in FIG. 3.

Referring now to FIG. 9, there is shown a perspective view of flange member 56, depicting the lower flange surface 66 and the openings 64 extending therethru. Alignment flange 56 is seen to include a pair of dowel pins 94 configured to be aligned with and received respective end openings of flange member 54. It is noted that alignment flanges 56 and 60 are structurally identical, and alignment flanges 54 and 58 are structurally identical and similar to flanges 56 and 60 but have recesses 96 corresponding to receive opposing dowel pins 94. The flange member 56 is seen to include the inner seal compression lip 97 configured to engage the respective annular seal 42 and 44 to prevent the seals from rotating inside the seal body 12. The flange member 56 is also seen to comprise an outer seal retaining lip 98 configured to hold the seal bodies 30 and 32 together when pressurized.

Figure 10:
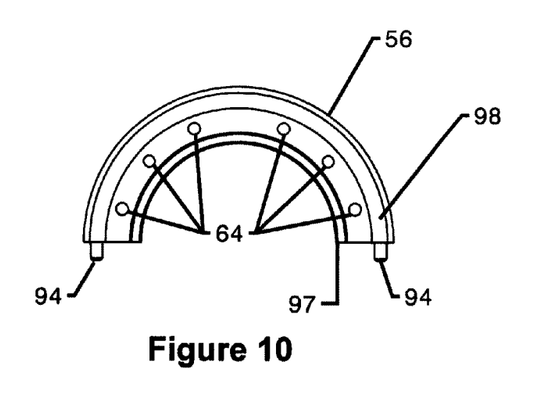
FIG. 10 is a front view of the alignment flange shown in FIG. 9.

Referring now to FIG. 10, there is shown a side view of alignment flange 56 and 60.

Figure 11:
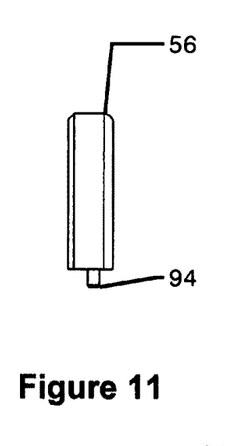
FIG. 11 is an side view of the alignment flange shown in FIG. 9.

Referring now FIG. 11 there is shown an end view of flange 56 and 60.

Figure 12:
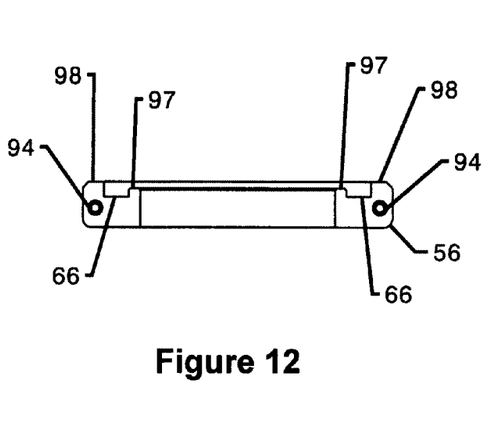
FIG. 12 is an end view of the alignment flange shown in FIG. 9.

Referring now to FIG. 12, there is shown an end view of the alignment flange member 56 and 60.

Figure 13:
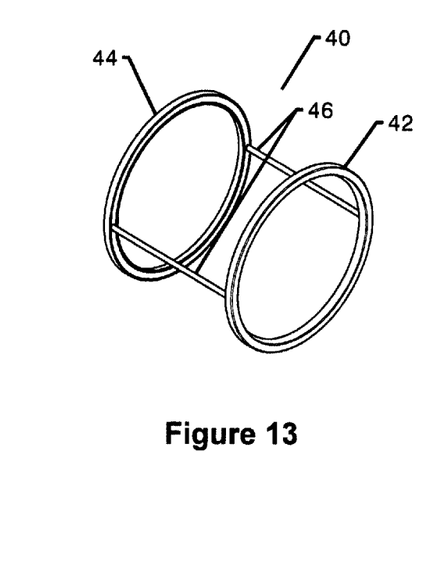
FIG. 13 is a perspective view of the radial shaft seal of FIG. 3.

Referring now to FIG. 13 there is shown a perspective view of the horizontal/radial shaft seal 40, including the proximal ring seal 44, the distal ring seal 42 and the pair of laterally extending seals 46.

Figure 14:
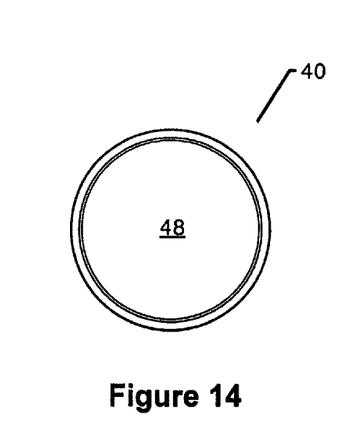
FIG. 14 is an end view of the radial shaft seal shown in FIG. 13.
Figures 15, 16:
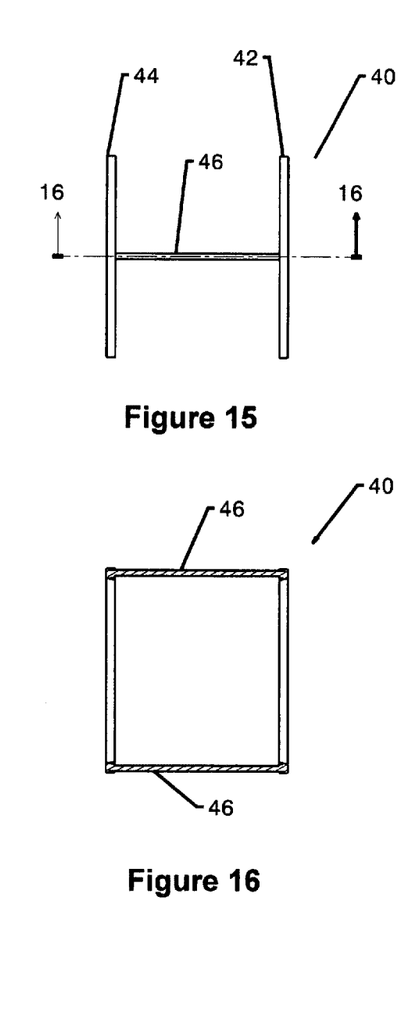
FIG. 15 is a side view of the radial shaft seal shown in FIG. 13.
FIG. 16 is a side sectional view of the radial shaft seal shown in FIG. 13.

Referring now to FIG. 14 there is shown an end view of the horizontal/radial shaft seal 40 including an axial opening 48 configured to receive the drive axle 14. During assembly, this radial shaft seal 40 is secured to the plated drive axle portion 34, by the seal bodies 30 and 32 and end cap flange members 50 and 52.

The end caps/flanges 50 and 52 may be comprised of a bronze alloy, or some other alloy with similar bearing properties. The horizontal/radial shaft seal 40 may be comprised of rubber, and preferably Viton. However, other suitable materials may be employed as desired, depending on factors such as strength, weight, cost, environmental factors such as corrosion and so forth. The fasteners 68 may be comprised of socket head cap screws. If desired, the alignment flanges may be provided with a chamber body bearing end cap and may be comprised of a bronze alloy. The alignment flanges that engage the rotating drive axle 14 may comprise of a bronze alloy as well, which is preferred as it has extended wear capabilities and can withstand substantial heat.

Figure 17:
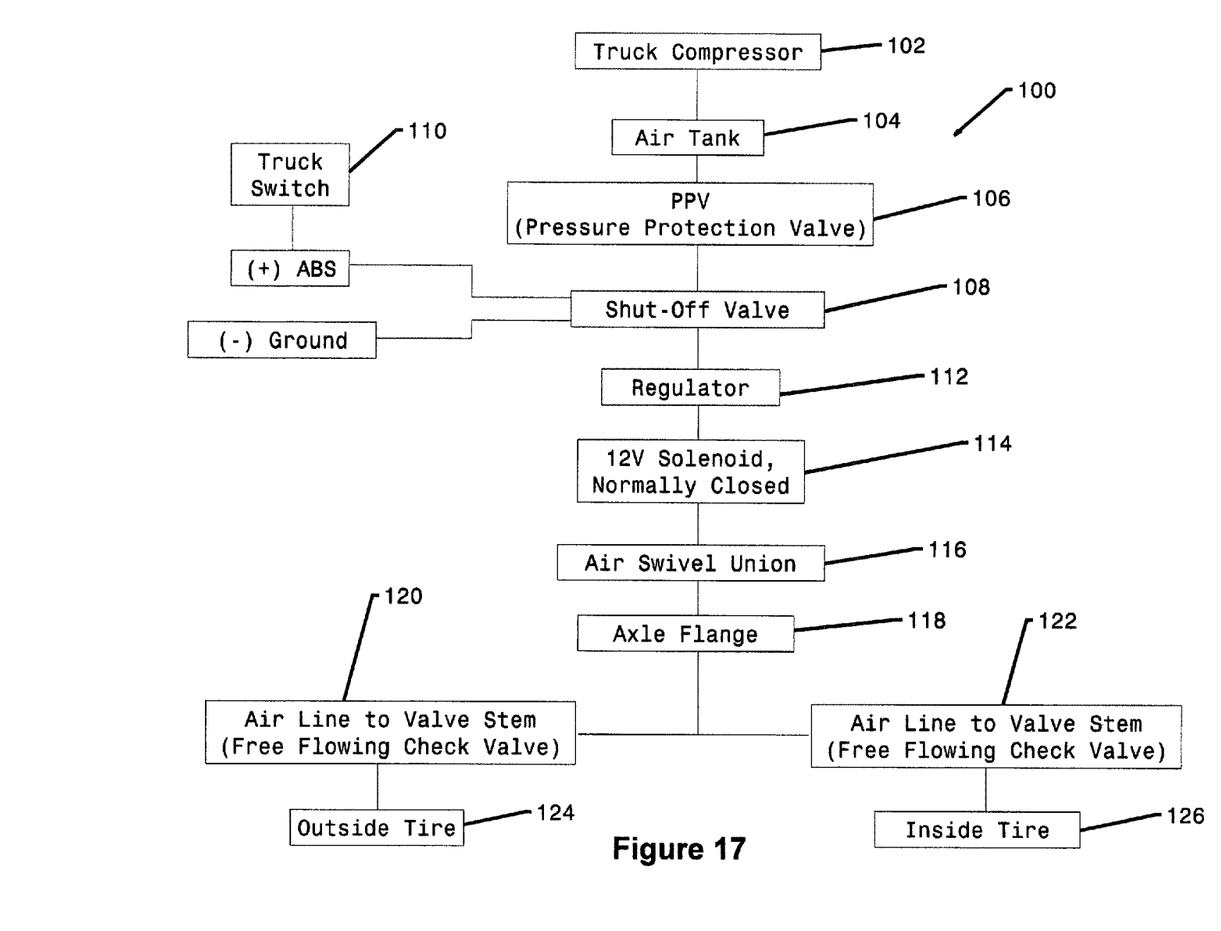
FIG. 17 is a block diagram of a tire inflation system that may include the sealing body.

Referring now to FIG. 17, there is depicted a block diagram of an air inflation system configured to employ system 10 including the sealing body 12. As depicted, a truck compressor 102 may provide an air source to an air tank 104 which communicates pressurized air to a pressure protection valve 106. The pressure protection valve 106 is configured to communicate pressurized air to a shut off valve 108 which may be electrically operated by a truck switch 110. The pressurized air is configured to be provided via a regulator 112 to a solenoid 114 that is normally closed. The pressurized air may be communicated from solenoid 114 to a sealed body 116 and an axel flange 118. Pressurized air thru the axle flange 118 is provided via a respective air line to valve stem 120 to the respective outside tire 124 and also to the valve stem as 122 to the respective inside tire 126. The present invention achieves technical advantages by delivering an air source via a drive axle to the center of the wheel hub and associated tires in a reliable and cost effective manner. The sealing body and tire inflation system can be performed at the axle factory. The present invention finds particular advantages in medium and heavy duty vehicles, such as in semi tractors, but also has applications in other vehicles and automobiles. The sealing body provides a reliable system providing air thru a rotating drive axle to a center portion of the axle flange, without involving complicated plumbing, or extensive modification of the drive axel system.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A vehicle drive axle tire inflation device for a vehicle having an axle flange, comprising:
    a drive axle configured to drive the axle flange and having a first diameter;
    a sealing body disposed about a first portion of the drive axle and forming a sealed chamber about the drive axle, including an opening coupled to the sealed chamber; and
    a conduit at least partially defined in the drive axle and configured to communicate a fluid between the sealed chamber and the axle flange;
    an alignment member cooperating with the sealing body to align the sealing body with respect to the drive axle, wherein the alignment member comprises a seal interposed between the sealing body and the drive axle;
    characterized in that the sealing body comprises at least two body members joined together to surround the drive axle, which said at least two body members individually do not surround the drive axle; and
    at least one longitudinal non-annular seal extending parallel to the drive axle and configured to seal the sealing body to the drive axle at an interface of the said at least two body members.

2. The device as specified in claim 1 wherein the drive axle is machined or plated proximate the sealing body.

3. The device as specified in claim 1 wherein the conduit has a longitudinally extending portion and a radially extending portion.

4. The device as specified in claim 1 wherein the sealing body has a wall and the opening disposed through the wall and in communication with the sealed chamber.

5. The device as specified in claim 4 further comprising a differential housing encompassing the seal body and having an opening therethrough, and a fluid passageway coupled between the differential housing opening and the sealing body opening.

6. The device as specified in claim 5 wherein the fluid passageway is defined by a shaft preventing rotation of the sealing body with respect to the differential housing.

7. The device as specified in claim 1 wherein the drive axle comprises a second portion comprising splines and having a second diameter.

8. The device as specified in claim 7 wherein the drive axle second portion second diameter is greater than the drive axle first portion first diameter.

9. The device as specified in claim 1 wherein the sealing body comprises a pair of curved members each extending 180 degrees about the drive axle.

10. The device as specified in claim 1 wherein the sealing body comprises two curved segments joined together to form a continuous said sealing body surrounding a mid portion of the drive axle.

11. The device as specified in claim 1 wherein the seal comprises at least one annular seal disposed about the drive axle and configured to seal the sealing body to the drive axle.

12. The device as specified in claim 1 further comprising two annular seals defined at opposing ends of the sealed chamber about the drive axle, wherein the at least one longitudinal seal extends between the two annular seals, wherein the two annular seals and the at least one longitudinal seal form a single member.

13. The device as specified in claim 1 wherein the at least two body members comprise juxtaposed members.

14. The device as specified in claim 1 wherein the at least two body members comprises arcuate shaped members radially opposed from one another about the drive axle.

15. The device as specified in claim 1 wherein the sealing body comprises at least one annular flange secured about the drive axle and forming a wall of the sealed chamber.

16. The device as specified in claim 1 wherein the drive axle conduit is configured to deliver air to a center portion of the axle flange.

17. The device as specified in claim 1 further comprising an air source coupled to the sealed chamber.

18. The device as specified in claim 1 wherein the sealing body includes a body surface comprising an alloy and configured to engage the drive axle and have reduced wear as the drive axle rotates therewithin.

19. A vehicle drive axle tire inflation device for a vehicle having an axle flange, comprising:
- a drive axle configured to drive the axle flange and having a first diameter;
- a sealing body disposed about a first portion of the drive axle and forming a sealed chamber about the drive axle, including an opening coupled to the sealed chamber; and
- a conduit at least partially defined in the drive axle and configured to communicate a fluid between the sealed chamber and the axle flange;
- an alignment member cooperating with the sealing body to align the sealing body with respect to the drive axle, wherein the alignment member comprises a seal interposed between the sealing body and the drive axle;
- characterized in that the sealing body comprises at least two body members joined together to surround the drive axle, which said at least two body members individually do not surround the drive axle; and
- wherein the sealing body further comprises a pair of end flanges disposed about the drive axle and forming end walls of the sealed chamber, wherein each of the end flanges are comprised of at least two members.

20. The device as specified in claim 19 further comprising a plurality of members interposed between the at least two body members and the end flanges and configured to align the at least two body members and the end flanges about the drive axle.

21. The device as specified in claim 20 wherein the plurality of members are comprised of dowel pins precisionally aligning the at least two body members and the end flanges to provide a precise radius about the drive axle.

* * * * *